Sept. 27, 1966 W. A. JOHNSON 3,275,399
MOTION PICTURE CAMERA
Filed Feb. 28, 1964 2 Sheets-Sheet 1
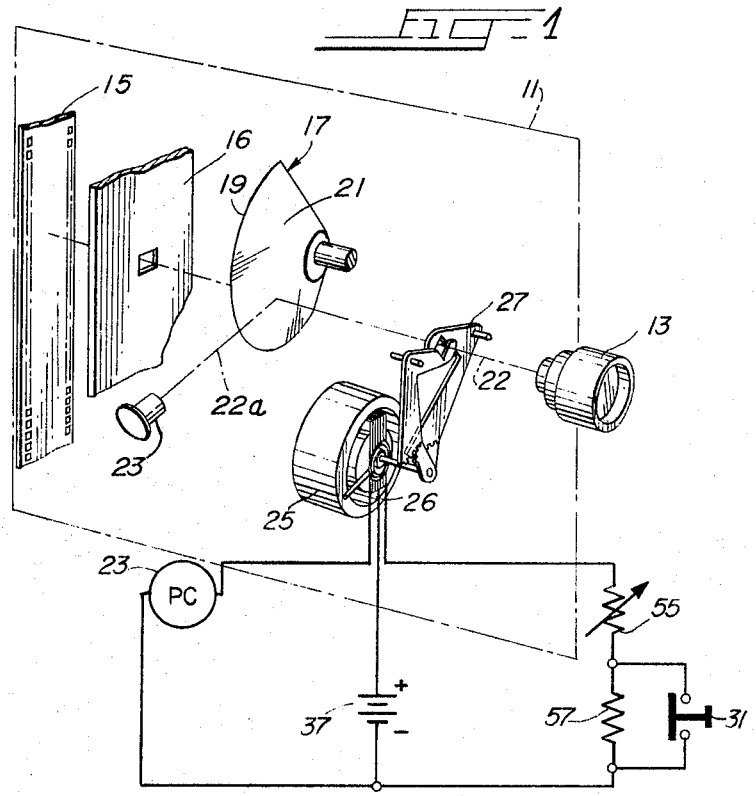
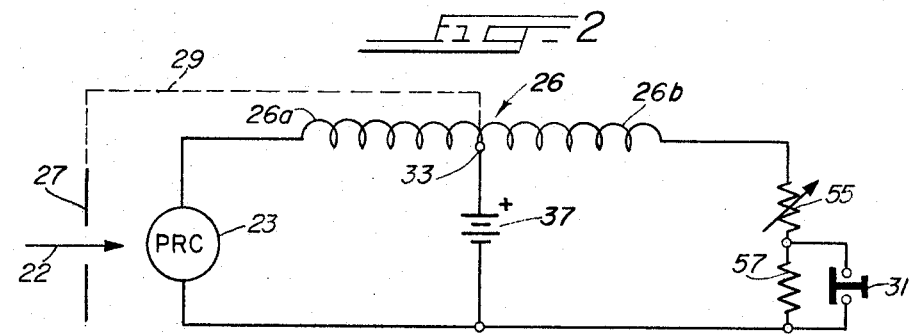
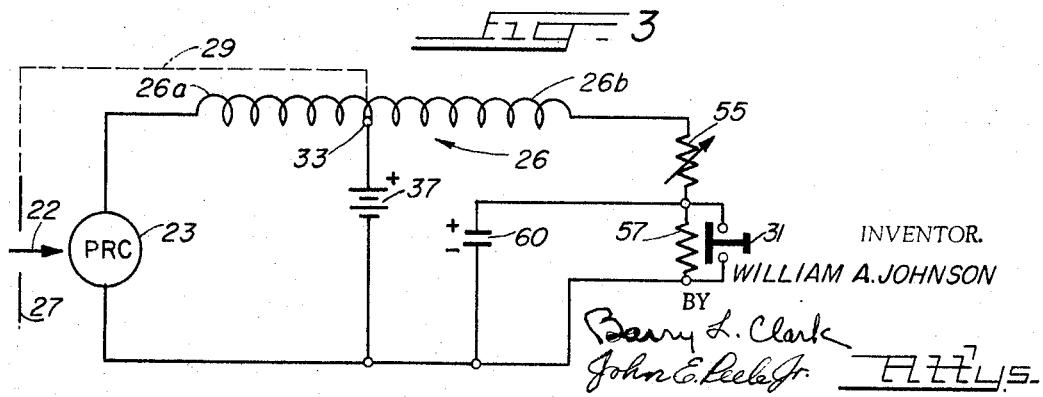
INVENTOR.
WILLIAM A. JOHNSON
BY
Barry L. Clark
John E. Peele Jr.
ATTYS.

INVENTOR.
WILLIAM A. JOHNSON
BY Barry L. Clark
John E. Peele Jr.
ATTYS

United States Patent Office 3,275,399
Patented Sept. 27, 1966

3,275,399
MOTION PICTURE CAMERA
William A. Johnson, Hoffman Estates, Ill., assignor to Bell & Howell Company, Chicago, Ill., a corporation of Illinois
Filed Feb. 28, 1964, Ser. No. 348,083
1 Claim. (Cl. 352—141)

The present invention relates to motion picture cameras equipped with a photocell or other light sensitive element for the measurement of the light admitted through an objective and reflected to the light sensitive element by a reflecting shutter, which element, through circuitry, automatically controls the diaphragm of the camera.

The prior art suggests the measurement of the light intensity reflected onto a light sensitive element from a reflecting shutter for the automatic control of the aperture setting of a diaphragm in a motion picture camera. In such cameras, the shutter is rotated, reciprocated or otherwise cyclically moved at a given rate to intermittently expose frames of film in the camera. Such a camera will have electrical circuitry including a light sensitive element which either directly or indirectly controls adjustment of the diaphragm in accordance with the amount of light falling on the light sensitive element. The electrical circuitry includes adjustable elements to permit compensation for the portion of the operating cycle of the shutter when the shutter is open and the reflecting portion is moved from the light path to permit light rays to reach the film. During this portion of the operating cycle, the photocell is affected by a lower average light intensity than when the shutter is stopped with the reflecting portion in the light path and through the associated circuitry, will tend to open the diaphragm in the direction of a larger aperture. When this compensation of the circuitry associated with the photocell is accurately made, the exposure of the film to the light falling on the subject being photographed is correct when the camera is operating normally, except as to the first few frames exposed after actuation of the camera, as will be later discussed. The term "correct" as above applied to exposure is intended to indicate that amount of exposure to light capable of producing a properly exposed image on a give type of film.

When the shutter operation is stopped, a portion of the shutter is normally left in the optical path in a "rest" position to prevent exposure of the film. Inasmuch as the surface of the shutter is intended to be a totally reflecting surface, it is obvious that while the shutter is stopped in the optical path, light is continually being reflected to the photocell. The photocell will then interpret the intensity of the light rays impinging thereon as being approximately double the intensity of the rays received when the camera is running since there is no interruption of these rays. The preceding "factor" is based on the assumption that during a normal running operation, the shutter is reflecting light to the photocell 50% of the time. The associated circuitry will then close the diaphragm approximately one f/stop in accordance with this doubling of light received by the photocell. When shutters of other types are used which reflect light to the photocell over a greater or lesser period of a cycle, the "factor" will be proportionately larger or smaller.

It is well known that a photocell will react rapidly to changes in light intensity when the overall level of light is high but will react more slowly when the overall level of light is low. The time required to effect changes in the diaphragm opening is further increased by the necessity to overcome inertia in moving the galvanometer and diaphragm blades connected thereto. Thus, at the low levels of light to which a photocell is typically exposed in a behind-the-diaphragm exposure control system using a reflecting shutter, the time required to change the diaphragm is such that the first few frames exposed after camera actuation are under-exposed. At the normal rates of motion picture film exposure, for example, 16 or 18 frames per second, as many as 5–10 or more frames may be improperly exposed before the exposure control system is operating at proper levels to provide correct exposure of the film.

The present invention overcomes the faults of the system mentioned above by providing a circuit to compensate for the above phenomenon hereinafter referred to as "start-up shift" and an actuating mechanism therefor as will be hereinafter described.

An object of the present invention is to modify the function of the circuitry associated with the light sensitive element in a motion picture camera having an automatic diaphragm to obtain proper exposure of the film at all times and especially during the interval immediately following the actuation of the camera starting button.

Another object is to provide a means to shift the balance of the diaphragm control circuitry when the camera is started so that there will be no change in the setting of the diaphragm, which change would cause improper exposure of the first few frames of the film exposed after actuation of the camera.

A further object is to provide improved results in a motion picture camera having a photocell for automatically determining the amount of light reaching the film therein, particularly with respect to start-up shift.

The foregoing and other objects and features of the present invention will appear from time to time as the following specification proceeds and with reference to the accompanying drawings, wherein:

FIGURE 1 is an exploded diagrammatic view of the exposure control mechanism of the present invention together with parts of the camera related thereto and including the circuit diagram of the control;

FIGURE 2 is a circuit diagram of a preferred start-up shift compensation circuit;

FIGURE 3 is a modified start-up shift compensation circuit incorporating a compensation controlling element;

Figure 4:
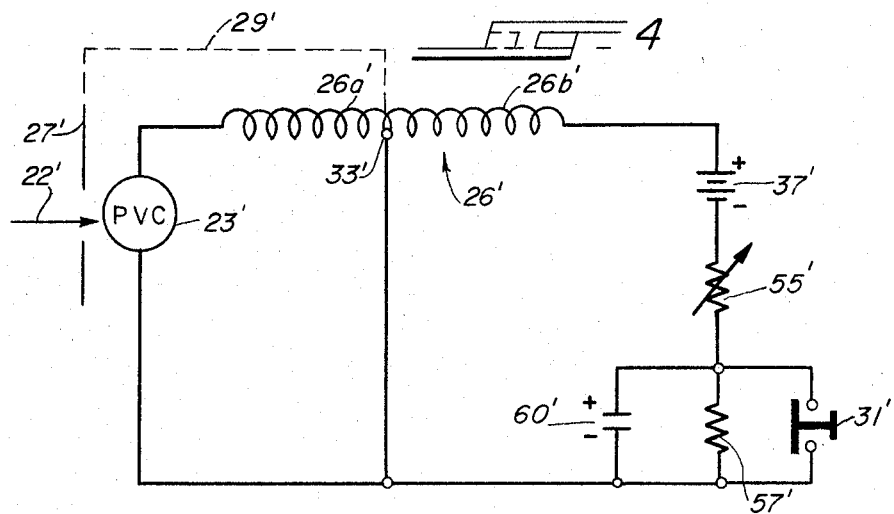
FIGURE 4 is another start-up shift compensation circuit using a current generating type of light sensitive element.

In FIGURE 1, parts of the optical and electrical system of a motion picture camera useful to the understanding of the inventive concept are shown. The optical objective 13 is positioned at the front of camera body 11 for passing light rays through adjustable diaphragm 27 to the film 15. The diaphragm opening is shown schematically as being automatically adjusted by motion of the moving coil 26 of the galvanometer 25 but may be adjusted through the usual mechanical galvanometer-diaphragm linkage. Interposed between the rear of the optical objective 13 and the film 15 is an aperture plate 16. Positioned adjacent the aperture plate 16 is a shutter 17 having a light obstructing portion or sector 19. The shutter is shown typically as a rotary shutter 17 in FIGURE 1 and as a reciprocating shutter 17″ in FIGURE 5. The sector is mounted for cyclical motion for intermittently breaking the light path 22 from the objective to the film. Mounted within the camera body near the light path is a light sensitive element or photocell 23. Also mounted within the body of camera 11 are the various electrical components necessary to the operation of the exposure control system. One of the electrical components of the circuit is a normally closed switch 31 of a conventional type. The switch is disclosed as being in an open condition as it would be with the camera operating. The necessary camera starting button is not separately shown, but is schematically disclosed as the switch 31 since the switch is controlled thereby and opens and closes as an incident of the actuation and release, respectively, of the starting button. Actuation of the starting button will permit operation of the camera through the usual spring or electric drive mechanism.

Figure 5:
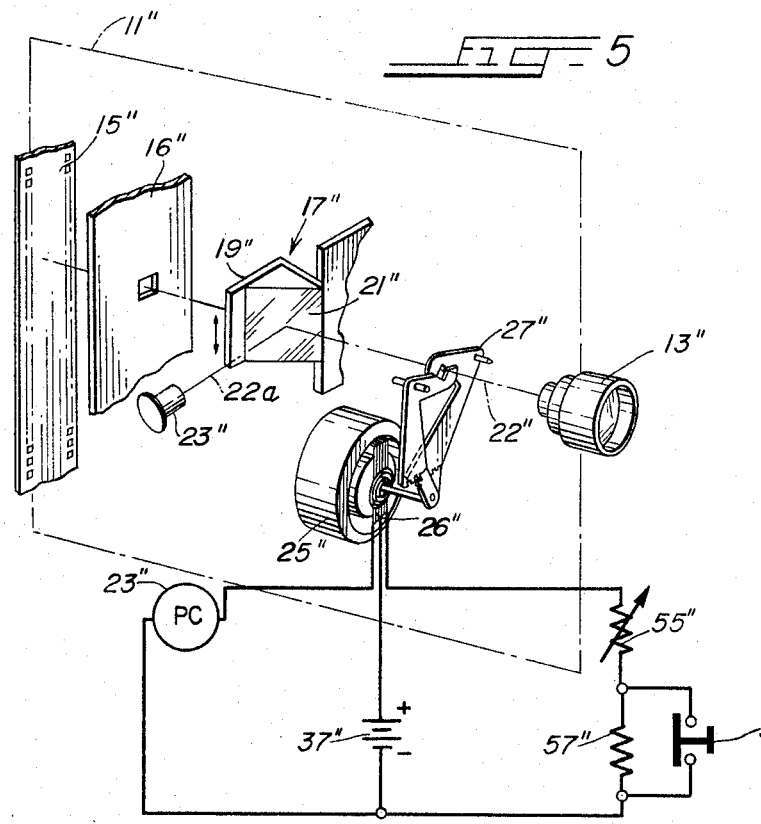
FIGURE 5 is an exploded diagrammatic view of the exposure control mechanism of the present invention together with parts of the camera related thereto including the circuit diagram of the control circuit wherein the shutter is of a reciprocating type.

The side of sector 19 facing the objective is polished or coated so as to have a reflecting or mirrored surface 21 thereon. The sector with its reflecting surface is shown angled at approximately 45° to the light path to deflect light rays along light path 22a to the photocell 23 positioned approximately as shown in FIGURES 1 and 5. It is to be understood that the angle of the reflecting surface may be varied over a range, e.g. between 30° and 60°, and the photocell positioned to receive the reflected light rays as required for a particular application. The photocell of the preferred embodiment is of the photoresistive type, for example, cadmium sulfide, but other types of light sensitive elements may be usd such as the photovoltaic type and, in particular, selenium.

The light rays striking the light sensitive surface of the photocell 23 of the photoresistive type will cause the photocell to vary in resistance in inverse proportion to th intensity of the light rays impinging thereon. The resistance will tend to increase as the light intensity tends to decrease. Similarly, there is a tendency to increase the resistance as the light decreases.

Such variations cause changes in current flow in the normally balanced circuit, shown particularly in FIGURE 2, temporarily unbalancing same. When the light intensity varies, current from battery 37, passing through coil portions 26a, 26b of the galvanometer 25, deflects the coil 26 from its normally stable position and adjusts the diaphragm blades 27 through galvanometer-diaphragm blade coupling 29 in accordance with the light intensity. This diaphragm adjustment thus controls the intensity of the light reaching the frames of film 15 to properly expose the same when the shutter 17 is operating and the sector 19 is intermittently interposed in the light path. This diaphragm ajustment also controls the amount of light reaching photocell 23 by reducing or increasing the intensity thereof until the circuit is again in balance at which time the galvanometer coil 26 is in a substantially stable position.

When the shutter 17 is operating in its normal cycle, the light rays 22 reach the film 15 during a portion of the cycle and are reflected to the photocell 23 during the remaining portion of the cycle. The relative duration of the various portions of the cycle depend upon the manner and kind of operation of the shutter. The shutter shown in FIGURE 1 is of the rotary type with the sector 19 comprising approximately half of a circle and therefore covering the film and reflecting light to photocell 23 during a time interval approximately half of a cycle. When the operation of the shutter mechanism is stopped or arrested through release of the starting button, sector 19 moves to a "rest" position such as that shown in FIGURE 1. In this "rest" position, the sector continuously reflects light to the photocell 23 along path 22a.

Another preferred embodiment is depicted in FIGURE 5 wherein double primed reference numerals refer to the same elements having similar numerals in FIGURE 1. The shutter 17″ is of the reciprocating type wherein light interrupting sector 19″ has a reflecting or mirrored surface 21″. The reflecting surface deflects light rays from light path 22″ along path 22a″ to the photocell 23″ during the period of the cycle in which the sector is interposed between lens 13″ and film 15″ as well as during the "rest" position. The portion of the cycle in which the light to the film is cut off beyond sector 19″ and reflected along path 22a″ is approximately one-half of the shutter operating cycle.

In FIGURE 2 is shown an exposure control circuit incorporating novel features in accordance with principles of the present invention. One lead of the photocell 23 is connected in circuit with a left coil portion 26a of the center tapped coil 26 so that said coil of the galvanometer is deflected from its normally stable position by an increase or decrease of current passing through the coil when there is a change in the resistance of the photocell. The coil 26 is tapped at 33 between its ends. The lead from this tap 33 is connected to one terminal of battery 37. Although the coil is referred to as being center tapped, the tap need not be exactly at mid-point on the coil as its position will be determined as required by the desired characteristics of the galvanometer and the overall system. The other side of photocell 23 is connected in circuit with another terminal of battery 37 to complete one loop in the circuit.

The other loop, which must balance with the one just described, shares the battery 37 and a portion 26b of galvanometer coil 26. In this part of the circuit is a trimming resistor 55, a fixed compensating resistor 57 and a switch 31 which permits the compensating resistor 57 to be selectively interposed in the circuit.

As previously indicated, the camera starting button is of the conventional type and either directly or indirectly controls switch 31 and causes the same to open and close upon actuation and release of the button. Upon release of the button, sector 19 moves to its "rest" position and the contacts of switch 31 will close effectively removing the start-up shift compensating resistor 57 from the circuit to decrease the resistance in the circuit and cause the current flow in the right loop to be increased such that the current flow in the left loop will balance in a different range than when the shutter is operating. A trimming resistor 55 remains in the circuit.

This trimming resistor 55 is adjusted to compensate for variations in components of the circuit and other elements affecting exposure, for example, variations in the reflectivity of the shutter blade. The adjustment therefore balances the circuit in one given range to cause the current flow in the adjusted righ loop to be a standard against which the current flow in the left loop, as varied by the varying resistance of the photocell, will be balanced.

When the starting button is actuated, the shutter begins operating and the photocell 23 is exposed to the lower average intensity of the interrupted light. Simultaneously, the contacts of switch 31 are opened and the fixed compensating resistor 57 is effectively added to the circuit to modify the total resistance in the circuit so as to achieve balance between the loops in the higher operating level of light intensity.

Immediately after the contacts of switch 31 are opened or closed, the circuit will tend to shift from one balanced condition to another. The shift in the balanced conditions, particularly on start-up will thus effectively prevent any change in the diaphragm opening between the operating and stopped conditions of the shutter, and the first few frames exposed after actuation of the camera starting button will be properly exposed.

In FIGURE 3 is a modification of the circuit previously discussed with respect to FIGURE 2. The presence of the capacitor 60 in the circuit provides a controlling factor for the current flow when the starting button is actuated and the switch contacts are opened. Capacitor 60 has a rating which will permit the current flow in the right hand loop to decrease at about the same rate as current in the left hand loop decreases due to the increased resistance of the photocell as the photocell returns to its normal interrupted light condition. As previously indicated, the resistance of the photocell 23 changes rapidly in high overall light levels but much more slowly under the low overall light levels necessary for some practical applications in cameras. Thus, the period of change of the resistance of the photocell may take from a fraction of a second to several seconds to become corrected to the lower average level of interrupted light when the shutter is first operated after a change from the higher level of continuous light when the shutter operation is stopped, depending upon the particular kind of photocell used. Upon starting the camera and insertion of the resistor into the circuit, the current flow would normally substantially decrease simultaneously therewith. With this decrease would come an attempt by the galvanometer coil to balance the circuit by adjustment of the diaphragm, since the effect of the lowered intensity of light striking the photocell will not have become sufficiently evident to balance the increased resistance of the opposing loop. With the controlling means or capacitor 60, the current flow in the right loop is allowed to decrease as the capacitor is charged while maintaining the galvanometer coil substantially stable. Thus, there will be no change in the amount of opening of diaphragm blades 27 and the first few frames exposed after camera actuation will be properly exposed.

Inductance means (not shown) may be inserted in series with the switch means 31 to smooth the current flow at the end of camera operation when the switch is closed so as to resist sudden changes in current and alleviate arcing across the switch contacts due to discharge of the capacitor 60. Just as the capacitor is only effectively in the circuit when starting the operation of the camera, the inductance is in circuit only at the stopping of camera operation.

The circuit modification disclosed in FIGURE 4 shows a circuit similar to that of FIGURES 2 and 3 but includes a photovoltaic type photocell 23', for example, a selenium cell, as the light sensitive element. The battery 37' is in the right hand loop of the circuit with trimming resistor 55' and balances the current flow through the galvanometer coil 26b' against the current through coil 26a' generated by the photovoltaic type photocell (PVC) 23'. The shift in the circuit to compensate for the non-operating condition of the shutter is made upon opening switch 31' to insert fixed resistor 57' in the same manner as previously described. The capacitor 60' is shown as being in the circuit for purposes as described as to FIGURE 3 but obviously may be omitted in accordance with the aforementioned discussion of FIGURE 2.

The invention has been described in detail with particular reference to preferred embodiments thereof, but it will be understood, of course, that these embodiments of the invention have been used for illustrative purposes only and that various modifications and variations in the present invention may be effected without departing from the spirit and scope of the novel concepts thereof.

I claim as my invention:

In a motion picture camera, in combination, an optical objective passing light rays along a light path, a shutter including a sector movable into and out of said light path, a reflecting surface on said sector, said shutter being selectively operable and adapted to be stopped with said sector in said light path, a light sensitive element, said element being positioned to receive light rays from said reflective surface when said sector is moved into said light path, a normally balanced two loop exposure control circuit means, a compensating means for said circuit means comprising a resistance means and a control means, said compensating means being selectively insertable, by means of a switch actuated with actuation of the shutter, into one loop of said circuit when said shutter is operating, said resistance means serving to reduce the amount of current flow in said one loop to balance with that through said light sensitive element of the other loop, whereby the current through said element when said shutter is stopped and said element is receiving constant illumination from said reflecting surface will be reduced to an amount equal to the current through said element when the shutter is operating and said element is receiving intermittent illumination from said reflecting surface, said control means including a capacitor for causing the exposure control circuit to return to normal after a predetermined period of time following effective insertion of the resistance means and the beginning of operation of the shutter when said element is receiving intermittent illumination from said reflecting surface of the shutter, whereby to cause the amount of current flowing in said exposure control circuit to remain substantially constant during the period required for bringing the shutter to full speed following a period in which it is stopped.

References Cited by the Examiner

UNITED STATES PATENTS

| | | | |
|---|---|---|---|
| 1,934,484 | 11/1933 | Camilli | 95—10 |
| 3,124,033 | 3/1964 | Freudenschuss | 95—64 X |
| 3,165,037 | 1/1965 | Neudecker et al. | 95—10 |
| 3,176,312 | 3/1965 | Reinsch | 95—64 X |
| 3,188,935 | 6/1965 | Lieser et al. | 95—64 |

NORTON ANSHER, *Primary Examiner.*

J. F. PETERS, *Assistant Examiner.*